United States Patent

Brunet

(10) Patent No.: US 6,591,545 B2
(45) Date of Patent: Jul. 15, 2003

(54) METHOD AND APPARATUS FOR THE SYSTEMATIC ERADICATION OF MOSQUITOES ADJACENT TO DWELLINGS

(76) Inventor: Jean-Guy Brunet, 1917 Indian Creek Road, Limoges, Ontario (CA), K0A 2M0

( * ) Notice: Subject to any disclaimer, the term of this patent is extended or adjusted under 35 U.S.C. 154(b) by 0 days.

(21) Appl. No.: 10/085,041

(22) Filed: Mar. 1, 2002

(65) Prior Publication Data

US 2002/0129539 A1 Sep. 19, 2002

(30) Foreign Application Priority Data

Mar. 13, 2001 (CA) .............................. 2340584

(51) Int. Cl.[7] .......................... A01M 1/22; A01M 1/24; A01M 1/02
(52) U.S. Cl. ...................................................... 43/112
(58) Field of Search .................... 43/112, 113, 119, 43/139

(56) References Cited

U.S. PATENT DOCUMENTS

| 1,807,076 | A | * | 5/1931 | Sweet | 43/139 |
| 1,885,854 | A | * | 11/1932 | Montellano | 43/139 |
| 4,908,978 | A | * | 3/1990 | Zacharias | 43/112 |
| 5,020,270 | A | | 6/1991 | Lo | 43/112 |
| 5,241,779 | A | * | 9/1993 | Lee | 43/112 |
| 5,255,468 | A | | 10/1993 | Cheshire, Jr. | 43/113 |
| 5,301,458 | A | | 4/1994 | Deyoreo et al. | 43/139 |
| 5,347,748 | A | * | 9/1994 | Moreland et al. | 43/112 |
| 5,595,018 | A | | 1/1997 | Wilbanks | 43/112 |
| 5,647,164 | A | | 7/1997 | Yates | 43/139 |
| 5,799,436 | A | | 9/1998 | Nolen et al. | 43/112 |
| 6,050,025 | A | | 4/2000 | Wilbanks | 43/112 |
| 6,055,766 | A | | 5/2000 | Nolen et al. | 43/112 |
| 6,305,122 | B1 | * | 10/2001 | Iwao et al. | 43/112 |
| 6,341,444 | B1 | * | 1/2002 | Cina et al. | 43/98 |
| 6,421,952 | B1 | * | 7/2002 | Vascocu | 43/112 |
| 6,474,014 | B1 | * | 11/2002 | Yu | 43/98 |
| 6,530,172 | B2 | * | 3/2003 | Lenz | 43/112 |

FOREIGN PATENT DOCUMENTS

| DE | 2314375 | B1 | * | 3/1974 |
| JP | 7-152455 | B1 | * | 6/1995 |
| JP | 10-225255 | B1 | * | 8/1998 |
| JP | 11-346629 | B1 | * | 12/1999 |
| JP | 2002-159251 | B1 | * | 6/2002 |
| WO | WO-97/10709 | B1 | * | 3/1997 |
| WO | WO-99/37145 | B1 | * | 7/1999 |

* cited by examiner

*Primary Examiner*—Darren W. Ark
(74) *Attorney, Agent, or Firm*—David J. French

(57) ABSTRACT

Apparatus and method for killing mosquitoes outdoors and in the neighborhood of a building normally occupied by humans or animals, has an electrical grid for killing the mosquitoes and which is suitable for mounting adjacent the building and is connectable to a supply of voltage, the grid separating an interior space, usually within the surrounding grid, from the atmosphere outside of the building, and being such that, when the grid is attached to a voltage supply, mosquitoes are killed on attempting to pass through the grid. A duct connects the interior space to the interior of the building so that air containing carbon dioxide produced by occupants of the building passes through the duct and into the interior space where it attracts mosquitoes to the grid for electrocution. Preferably, the apparatus includes a fan for pulling air containing carbon dioxide from inside the building through the duct and into said interior space.

16 Claims, 2 Drawing Sheets

METHOD AND APPARATUS FOR THE SYSTEMATIC ERADICATION OF MOSQUITOES ADJACENT TO DWELLINGS

BACKGROUND OF THE INVENTION

1. Field of the Invention

The present invention relates to the eradication of mosquitoes outdoors, especially close to dwellings or other buildings having humans or animals. The invention provides a system whereby the mosquitoes may be destroyed on a continual basis, where they gather, so that the insect population will decline.

It is the breeding female mosquitoes that are most active and which are attracted to humans and animals. By destroying these females the overall quantity of eggs laid within a specific area will be reduced and the overall number of mosquitoes will decline.

The invention makes use of the common knowledge that mosquitoes are attracted to heat and carbon dioxide. It is also known that these insects congregate at the lee side of buildings away from direct sunlight and wind. They will gather in the evening hours especially when the outside temperature drops below the temperature inside the building.

2. Prior Art

Many devices for killing mosquitoes outdoors are known. The majority of these use an electrically charged grid capable of killing mosquitoes which attempt to pass through the grid. The mosquitoes are attracted to the grid by various means, including canisters which produce carbon dioxide and/or special attractant chemicals, combustion of fuel which produces carbon dioxide, or by light, or heat. The use of these various attractants is discussed in the following patents:

U.S. Pat. No. 5,020,270, issued Jun. 4, 1991 to Lo;
U.S. Pat. No. 5,255,468, issued Oct. 26, 1993 to Cheshire, Jr.;
U.S. Pat. No. 5,301,458, issued Apr. 12, 1994 to Deyoreo, et al;
U.S. Pat. No. 5,595,018, issued Jan. 21, 1997 to Wilbanks;
U.S. Pat. No. 5,647,164, issued Jul. 15, 1997 to Yates;
U.S. Pat. No. 5,799,436, issued Sep. 1, 1998 to Nolen, et al.;
U.S. Pat. No. 6,050,025, issued Apr. 18, 2000 to Wilbanks, and
U.S. Pat. No. 6,055,766, issued May 2, 2000 to Nolen, et al.

Systems using canisters or fuel for providing carbon dioxide and/or other attractants have the disadvantage that the canisters or fuel need constant replenishment or replacement. The present invention provides apparatus which avoids this drawback, and which can operate for lengthy periods with nothing but a small supply of electricity.

Applicant is also aware of U.S. Pat. No. 6,305,122, issued Oct. 23, 2001 to Iwao, et al., which issue date is after Applicant's priority date. The Iwao, et al. patent is different from the others in that, in addition to using chemical-type carbon dioxide generators of various kinds, it also suggests using carbon dioxide produced by humans or animals. Specifically, it includes a fourth embodiment shown in FIGS. 10 and 12 which uses carbon dioxide produced by dogs to kill mosquitoes in the neighbourhood of a dog house, and fifth and sixth embodiments shown respectively in FIGS. 12 to 14, and in FIGS. 15 and 16, which use carbon dioxide produced by human beings, along with heat produced by a heater, to attract the mosquitoes to the neighbourhood of a house. The fifth embodiment uses a sticky sheet to trap the mosquitoes, whereas the fourth and sixth embodiments use electric grids to kill the mosquitoes.

In the dog house version of the Iwao, et al. patent, the electric grid is in the ceiling of the dog house so that dead mosquitoes will fall inside the house. In the sixth embodiment, the grid is held vertically within a box structure installed in the wall of a house, so that dead mosquitoes will pile up inside this structure against the grid. No method of removing the mosquitoes is described; removal would seem to require some disassembly of the box structure. If not removed the dead mosquitoes would reduce the effective area of the grid.

SUMMARY OF THE INVENTION

The present invention avoids the need for canisters, fuel, etc., for supplying carbon dioxide by using the carbon dioxide produced by humans or animals inside a building, this carbon dioxide being ducted to mosquito killing apparatus which is located outside the building. Heat and moisture produced inside the building may also provide supplemental attractants. Unlike with the Iwao, et al. patent, the apparatus of this invention causes the dead mosquitoes to drop away easily from an electric grid and fall outside the building, and no special mosquito removal step is required.

In accordance with one aspect of the invention, apparatus for killing mosquitoes outdoors and in the neighbourhood of a building with an interior normally occupied by humans or animals, comprises:

exterminating means including an electrical grid, said means being suitable for mounting outdoors and adjacent said building and connectable to a supply of voltage, said grid separating an interior space from an atmosphere outside of the building, and being such that, when the grid is attached to a voltage supply, mosquitoes are killed on attempting to pass through the grid;

a duct for passing through a wall of the building and for connecting said interior space to the interior of the building, the arrangement being such that air containing carbon dioxide produced by occupants of the building passes through the duct and into said interior space where it attracts mosquitoes to the grid for electrocution, and wherein said grid is disposed above a relatively unobstructed space to allow mosquitoes to fall freely away from the grid and outside the building.

Generally, the grid is situated so that dead mosquitoes simply fall to the ground under the grid and outside the wall of the building. While the grid may be vertical, in preferred embodiments the grid is generally flat and either horizontal or sloping, in each case having its downwards side facing the outside atmosphere, so that dead mosquitoes may more easily fall off. If any container is used to collect the dead mosquitoes, this is spaced so that it does not cause mosquitoes to pile up against the grid, as would happen in the Iwao et al. patent.

The apparatus is mounted on an outside wall of a building, preferably on the lee side, with the duct passing through an opening in the wall to access the interior air. Preferably a fan, such as an in-line fan or duct fan, moves warm, moist air containing carbon dioxide from inside the building and through the duct into the interior space, which is inside the grid or adjacent the grid. The interior space may be inside an inner cylindrical grid of a standard kind of mosquito exterminating device sometimes termed an "ELECTRIC KILLING DEVICE" or EKD. Such devices usually have a light for attracting the mosquitoes, but this light is not needed with apparatus in accordance with this invention. The air passes out through the grid of the EKD into the atmosphere. Mosquitoes detect the warm, carbon dioxide containing air and follow the trail back to the EKD; as they try to locate the source of the air they strike the grid and are electrocuted. The dead insects fall out of the open bottom of the EKD to the ground or into a suitable container.

The use of a fan is a further distinction over the Iowa, et al. patent in which the corresponding sixth embodiment has no fan so that there would seem to be little movement of carbon dioxide to the outside where it can attract mosquitoes.

Preferably a screen is provided in the duct which prevents any mosquitoes entering the building even when the grid is not energized.

The invention also provides a method for killing mosquitoes, comprising conducting carbon dioxide containing air, produced by humans or animals inside a building, through a duct to the outside of the building, and supplying this air to an interior space separated from the outside atmosphere by an electrically charged grid, so as to attract mosquitoes to the grid where they are killed, and allowing the killed mosquitoes to fall away from the grid.

BRIEF DESCRIPTION OF THE DRAWINGS

Preferred embodiments of the invention will now be described by way of example with reference to the accompanying drawings, in which.

DESCRIPTION OF THE PREFERRED EMBODIMENT

Figure 1:
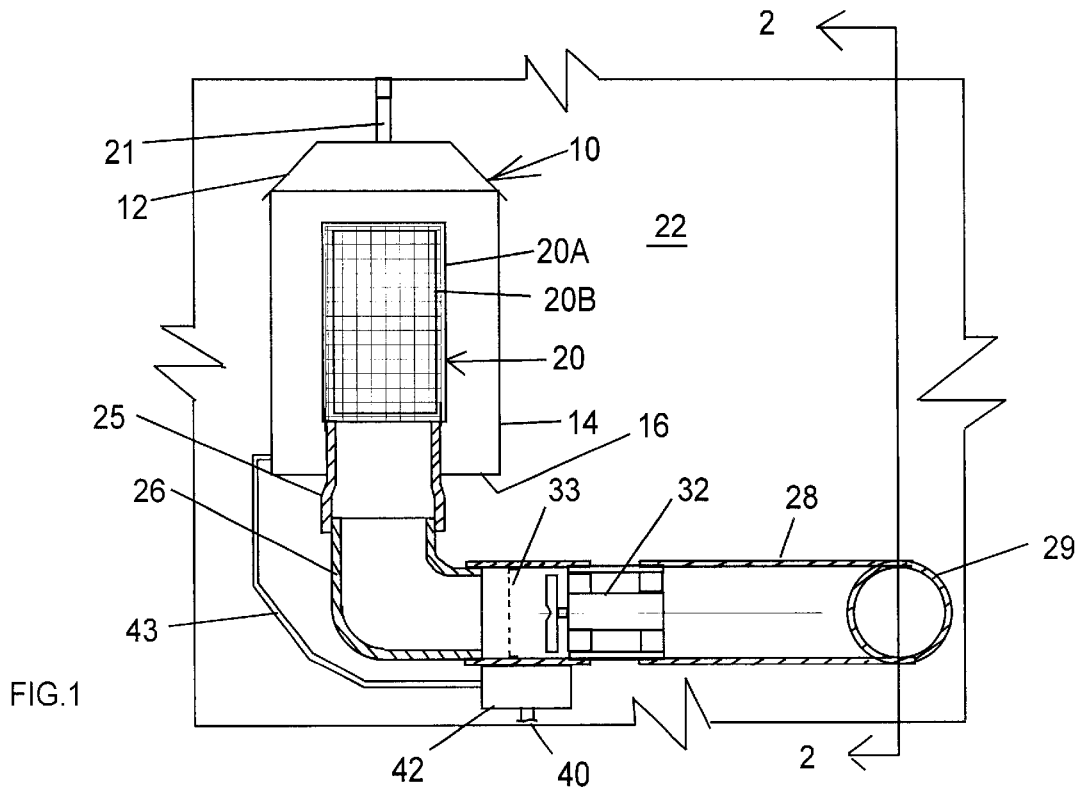
FIG. 1 is a diagrammatic longitudinal sectional view of an insect attracting and killing device according to the invention, the section being taken parallel to the wall of a building.
Figure 2:
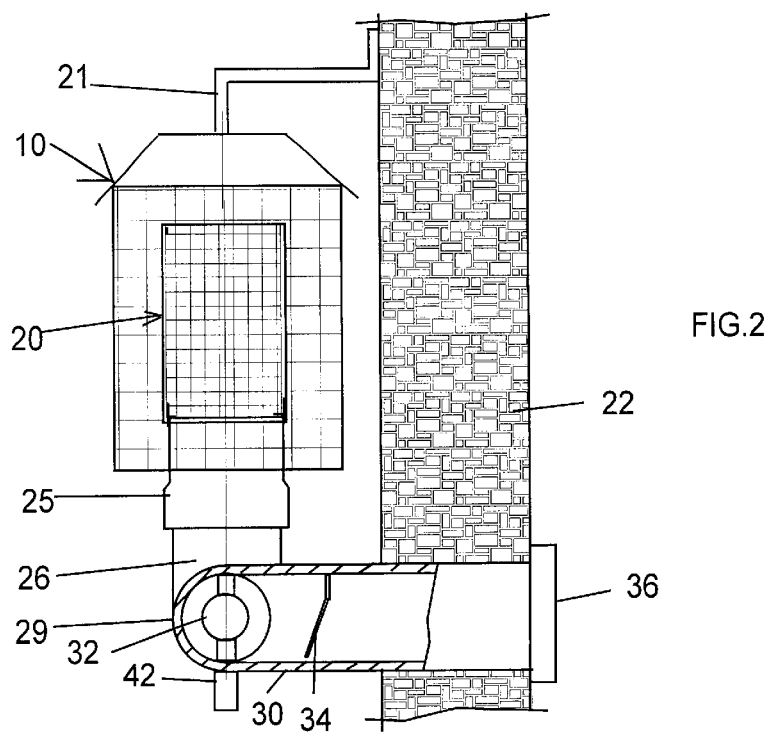
FIG. 2 is a view on lines 2—2 of FIG. 1 showing how the apparatus is mounted on the building wall, which wall is shown in cross-section.

Referring to FIGS. 1 and 2, the apparatus uses, for convenience, a modified form of a standard Electric Killing Device or EKD 10 of the type currently available and which is normally a stand-alone unit having a casing with a closed top 12 and apertured sides 14 joined to an apertured base 16. This unit normally has a fluorescent light in its center to attract insects and cause them to try to pass through an electrified grid 20 of cylindrical form and which includes closely spaced outer and inner cylindrical grid portions 20a, 20b, which are connected to voltage sources of opposite polarity. The apertured sides 14 provide a screen which prevents childrens' fingers, for example, from touching the electrified grid. For use with this invention, the usual central light source may be removed, as it is not needed to attract the mosquitoes. Removal of the light not only saves electricity but also prevents the apparatus attracting other large insects such as moths which tend to cling to the electric grid and which eventually block the grid unless constantly removed. However, the light may be retained if it is desired to kill those insects attracted to light.

The unit 10 is mounted by a simple bracket 21, attached to the top 12 as shown in FIG. 2, the bracket being fixed to an exterior wall 22 of a suitable building, i.e. one normally occupied by humans or animals.

A tabular adapter 25 has its upper end inserted into the EKD 10 so as to protrude into the lower end of the inner cylindrical grid 20b, being a good fit within the grid such that no insect can pass into the outer, upper end of this adapter without passing through the grid. The lower end of this adapter fits onto an elbow 26, which is connected to the outer end of an outer duct portion 28 extending along the side of the building wall 22 and having an inner end portion provided by a second elbow 29 and an inner extension 30, which extension 30 passes through an opening in the wall 22. A low volume in-line or duct fan 32, having a typical capacity of 80 cu.ft/min., is located in a section of duct pipe 28 between the EKD 10 and the wall 22 to draw air from inside the building into the interior space within the grid 20. This arrangement allows the grid to be spaced from and out of alignment with the inner extension and therefore with the opening through the wall.

A screen 33 is located in the duct 28 between the EKD 10 and the fan 32 to prevent insects from entering the building when the apparatus grid is not energized. A flap 34 in the inner extension 30 of the duct prevents the ingress of cold air into the building when the apparatus is not in use (i.e. winter). The inner end duct extension 30 has a decorative face plate 36 located on the inside of the wall opening.

A power cord 40 and junction box 42 are provided to supply electrical power both to the grid 20 of the EKD 10, via cable 43, and to the fan 32. The apparatus is energized by plugging the power cord into an exterior outlet which then can be activated by an interior switch or a timing device. Alternatively, the unit may be wired directly to an interior switch.

The invention does not require the introduction of solid or liquid baits, or carbon dioxide producing fuel or devices. No supplementary heat sources or lights need be incorporated into this device.

FIG. 1 is a typical mounting. However, the unit may be installed horizontally, or may include a flat grid mounted in a circular or rectangular housing and oriented in such a way as to be self-cleaning; examples of such arrangements are shown in FIGS. 3 and 4.

Figure 3:
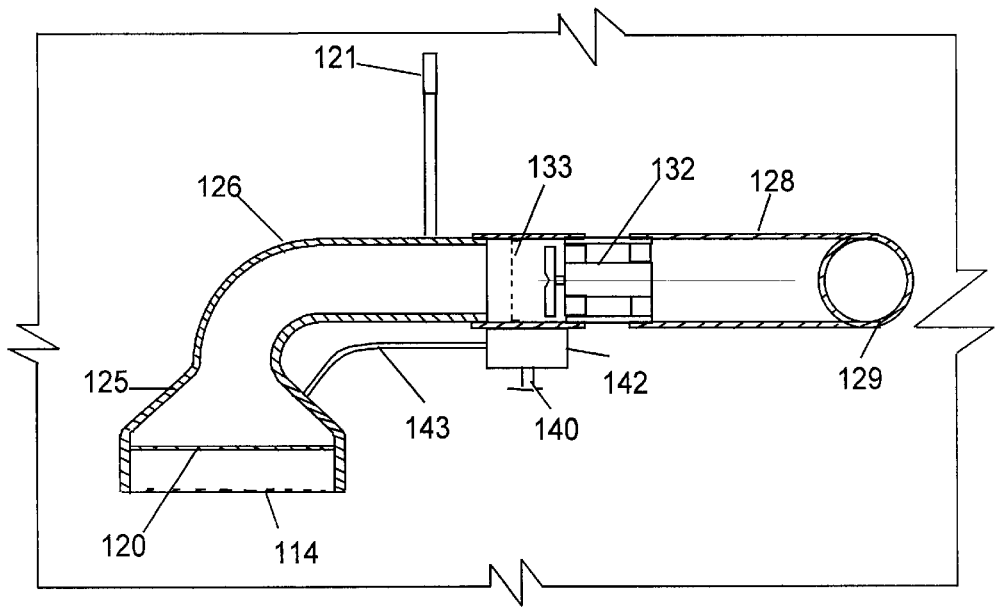
FIG. 3 shows a view similar to that of FIG. 1 of a second embodiment of the invention.

In FIG. 3, parts similar to those of FIGS. 1 and 2 are shown by corresponding reference numerals increased by 100, so that parts 121, 128, 129, 132, 133, 140, 142, 143, are very similar and correspond to the parts 21, 28, 29, 32, 33, 40, 42, and 43, respectively, of the first embodiment. Here however, the elbow part 126 of the duct has a depending outer portion which leads to a diverging, funnel-shaped adapter portion 125, the lower end of which is provided with a horizontal electric grid 120, below which is a protective outer screen 114. The lower side of the grid 120 is open to the atmosphere so that mosquitoes can pass through the screen and become electrified by the grid, This arrangement makes it easier for the dead mosquitoes to fall from the grid, through the screen 114, onto the ground, as compared to the vertically oriented grid of FIGS. 1 and 2.

Figure 4:
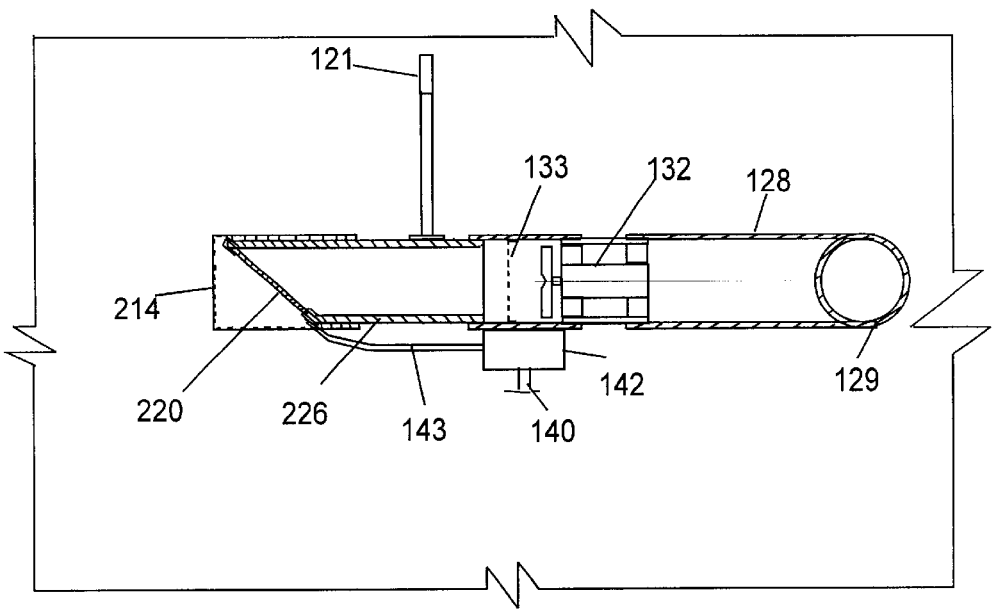
FIG. 4 shows a view similar to that of FIG. 1 of a third embodiment of the invention.

FIG. 4 shows an arrangement somewhat similar to that of FIG. 3, and corresponding parts are given the same reference numerals. Here the construction is made simpler than in FIG. 3 by having the adapter portion 226 as a straight tube but with its outer end cut off at an oblique angle, this outer end being provided with a sloping electric grid 220 with a downwards facing outer surface, and which is protected by an outer screen 214. This also provides an arrangement in which dead mosquitoes can easily fall off the grid.

While the embodiments shown have pipe-like ducts connecting the interior of the building to the electric grid, it may be noted that the term "duct" can include any passageway, even a short one, connecting the interior of a building to its exterior. However, when used with a typical dwelling, it is preferred that the grid be out of alignment with, and spaced substantially away from, any opening in the wall, say at least 18 inches away from such opening, since the grid produces some noise in operation which may be annoying if the apparatus is too close to a wall opening.

The invention is designed to operate as a maintenance free appliance. The wall mounting places the apparatus at a safe height for small children, and the apertured casing prevents persons contacting the electrically charged grid.

The inventor has successfully tested this system, at his residence, under various conditions, producing several hundred mosquito kills during a typical overnight period. As the spring/summer season progresses these numbers fall off if the system is used regularly.

I claim:

1. Apparatus for killing mosquitoes outdoors and in the neighbourhood of a building with an interior normally occupied by humans or animals, comprising in combination with an exterior wall of said building, said wall having an interior side exposed to carbon dioxide produced by humans or animals:

a duct passing through an opening in said exterior wall, said duct having an inner end open to carbon-dioxide containing air on the interior side of said wall and having an outer end, a fan located for moving said carbon-dioxide containing air through the duct from its inner end to its outer end, exterminating means including an electrical grid connectable to a supply of voltage, said grid separating an interior space at the outer end of the duct from an atmosphere containing mosquitoes which surrounds said interior space and being such that when the grid is attached to the supply of voltage, mosquitoes are killed on attempting to pass through the grid;

the apparatus being such that air containing carbon dioxide produced by humans or animals can pass from the inner end of the duct through the duct and into said interior space where it attracts mosquitoes to the grid for electrocution, and wherein said grid is disposed above a relatively unobstructed space to allow mosquitoes to fall freely away from the grid.

2. Apparatus according to claim 1, wherein said electrical grid is cylindrical, and said interior space is inside said grid.

3. Apparatus according to claim 1, wherein a screen is provided in the duct which prevents any mosquitoes from passing through the duct even when the grid is not energized.

4. Apparatus according to claim 1, wherein a flap is located in the duct to prevent cold air from passing through the duct from its outer to its inner end.

5. Apparatus according to claim 1, wherein the electrical grid is part of a device having an outer casing, and wherein a wall mounting bracket is provided from which the outer casing may be suspended form said exterior wall.

6. Apparatus according to claim 1, wherein the grid is substantially flat and has a downwards facing outer side exposed to the atmosphere outside the building.

7. Apparatus according to claim 1, wherein the duct is sufficiently long to allow the grid to be spaced at least 18 inches away from the opening in said exterior wall through which the duct passes.

8. Apparatus according to claim 1, wherein said outer end of the duct is connected to an outer duct portion which is in turn connected by an elbow to an inner extension suitable for passing through said opening, whereby said grid is disposed out of alignment with said inner extension.

9. Apparatus for killing mosquitoes outdoors and in the neighborhood of a building with an interior normally occupied by humans or animals, comprising in combination:

an exterior wall of said building, said wall has an interior side exposed to carbon dioxide produced by humans or animals, a duct passing through an opening in said exterior wall, said duct having an inner end for communicating with said interior side and having an outer end exposed to an outside atmosphere containing mosquitoes, a fan located for moving said carbon-dioxide containing air through the duct from its inner end to its outer end, exterminating means including an electrical grid, said exterminating means being suitable for mounting on an outside of said exterior wall and connectable to a supply of voltage, said grid separating an interior space at the outer end of the duct from said outside atmosphere, and said grid being such that, when the grid is attached to the supply of voltage, mosquitoes are killed on attempting to pass through the grid;

the apparatus being such that air containing carbon dioxide can pass from the interior side of a wall through the duct and into said interior space where it attracts mosquitoes to the grid for electrocution, and wherein said grid is disposed substantially away from said opening and above a relatively unobstructed space to allow mosquitoes to fall freely away from the grid on the outside of said external wall.

10. Apparatus according to claim 9, wherein a screen is provided in the duct which prevents any mosquitoes from passing through the duct even when the grid is not energized.

11. Apparatus according to claim 9, wherein a flap is located in the duct to prevent cold air from passing through the duct from its outer to its inner end.

12. Apparatus according to claim 9, wherein the electrical grid is part of a device having an outer casing, and wherein wall mounting bracket is provided from which the outer casing may be suspended from said exterior wall.

13. Apparatus according to claim 9, wherein the duct is sufficiently long to allow the grid to be spaced at least 18 inches away from said opening in said exterior wall through which the duct passes.

14. Apparatus according to claim 9, wherein the grid is disposed out of alignment with said opening.

15. Apparatus according to claim 9, wherein said outer end of the duct is connected to an outer duct portion which is in turn connected by an elbow to an inner extension suitable for passing through said opening, whereby the grid is out of alignment with said opening.

16. A method for killing mosquitoes, comprising moving, by use of fan means, carbon dioxide containing air, produced by humans or animals inside a building, through a duct to the outside of the building, and supplying the air to an interior space separated from an outside atmosphere by an electrically charged grid, so as to attract mosquitoes in said outside atmosphere to the grid where they are killed, and causing the killed mosquitoes to fall from the grid outside the building, whereby the numbers of mosquitoes in the neighbourhood of a building may be reduced.

* * * * *